United States Patent Office 2,808,617
Patented Oct. 8, 1957

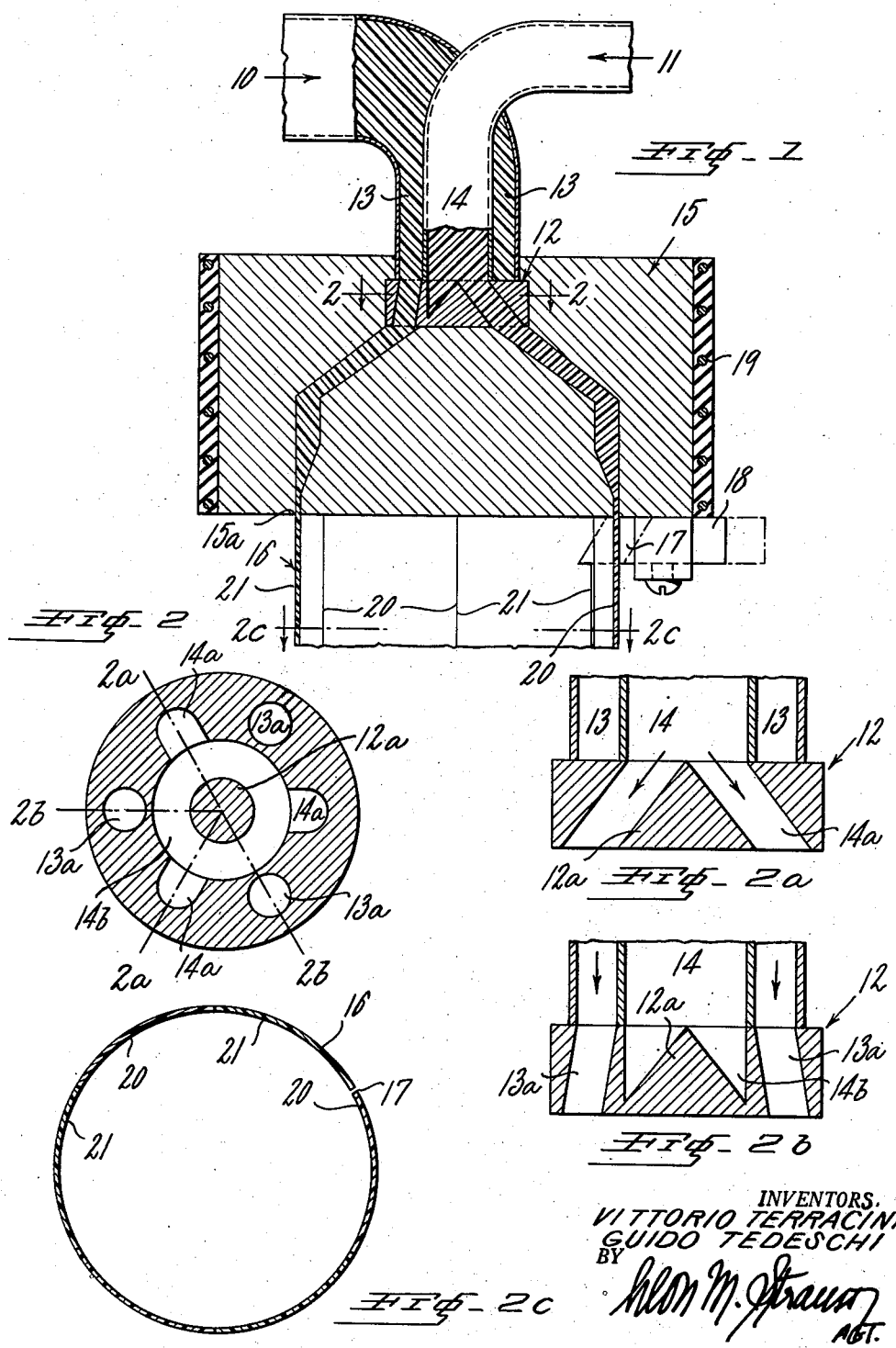

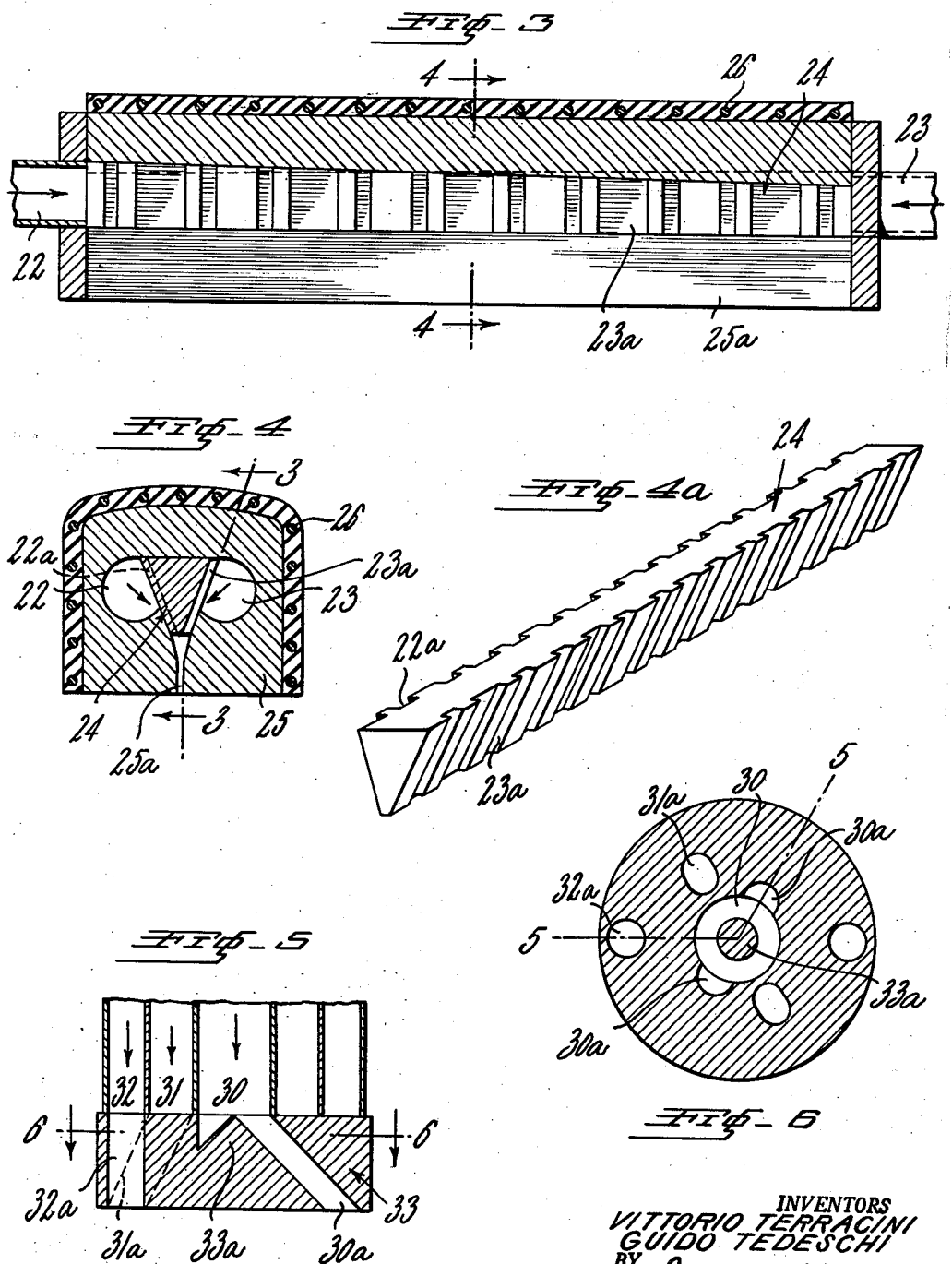

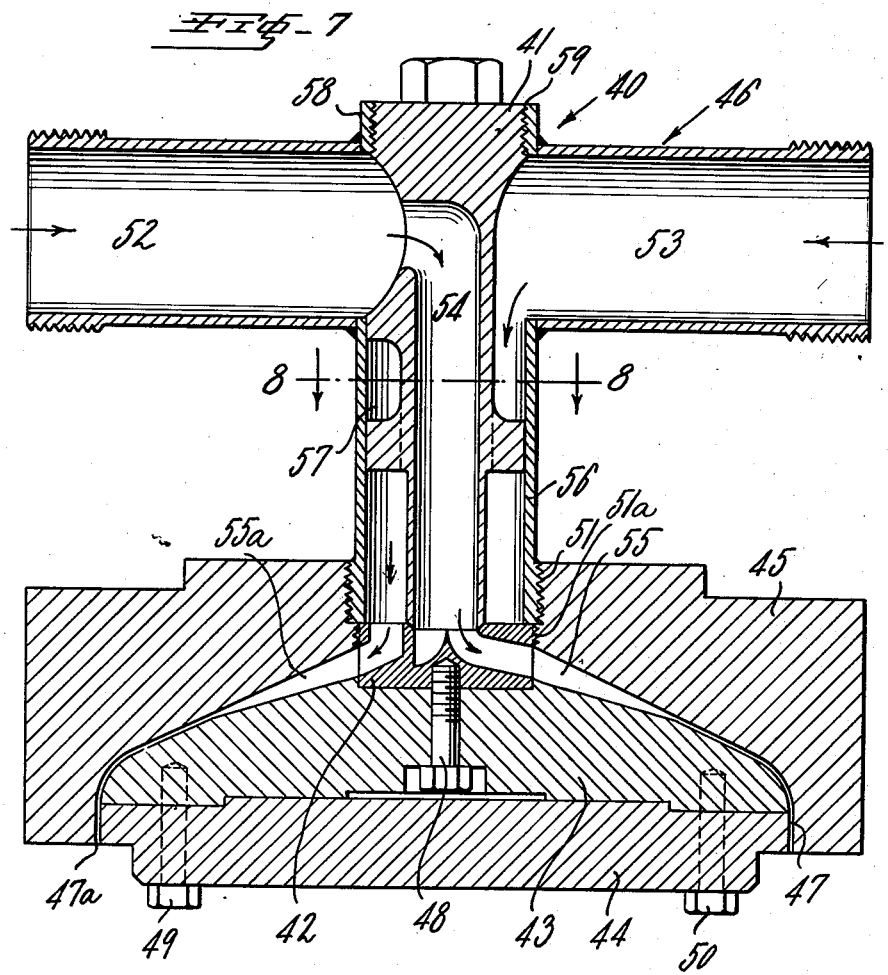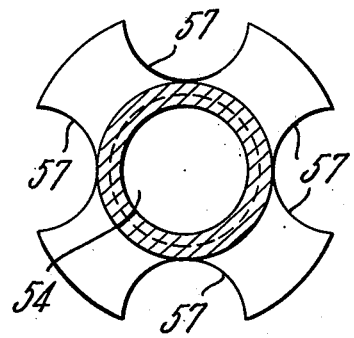

2,808,617

MEANS FOR MOLDING LENGTHY ARTICLES MADE FROM MULTI-COLORED PLASTIC MATERIAL

Vittorio Terracini and Guido Tedeschi, Oscar Porto, Sao Paulo, Brazil

Application September 5, 1952, Serial No. 307,972

2 Claims. (Cl. 18—13)

The present invention refers to process and means for molding sheets, plates, slats and similar lengthy articles from different colored plastic masses (especially thermoplastic, synthetic resins) to thereby present a product with alternate stripes or areas having different colors. Slats for various purposes, such as Venetian blinds, having one or more colors are usually made up by printing colors thereon or by painting the slat with color or paint layers which adhere solely to the surface of the slat, but are easily subjected to deterioration due to wear and other causes, such as atmospheric influences.

Another expedient employed for obtaining color effects is mechanically joining together several differently colored plastic strips and like parts. There are also strips, slats or sheets known having superimposed decorations thereon which necessarily lead to an increase in thickness of the finished article.

The object of the present invention is to provide means facilitating manufacture of strips, slats and like lengthy pieces having uniform thickness throughout the length thereof and having incorporated alternate stripes or areas each of homogeneous and distinct color throughout the entire thickness and exposed to view at opposite surfaces thereof.

The present invention is further directed to means affording the manufacture of slats, strips, blades and like sheet formations made from plastic materials having two or more colors and emanating from one mold connected to extrusion or like means.

Still a further object of the invention resides in the provision of means for obtaining a wear-resistant product which does not consist of composite parts joined or held together by soldering, sewing or superposition; the colored areas incorporated in the final product or article resisting infinitely better to wear and influence of atmospheric, chemical and other attacking agents than heretofore known color-printed slats, plates etc. which undergo only surface changes.

A further object of the invention is to provide means conducive to a considerably less expensive and extremely attractive article which is manufactured in one operation only, to thereby permit great reduction in labor and in time for manufacturing said article which can be readily cleaned and kept in usable state.

In conformity with the present invention the mold connected to one or more extrusion presses or means distributes supplies of thermo-plastic materials which are variously colored according to an established or desired pattern, is capable of accomplishing a uniform strip-like body or article providing equal resistance in all directions of its extent and characterized by alternating and continuous color areas each consisting of homogeneous colored plastic material presented either on both surfaces or throughout the whole thickness of the formed body.

The above and other objects and features will become apparent from the following detailed description, reference being had to the accompanying drawings.

In the drawings:

Fig. 1 shows schematically and in section a round extrusion mold, in which tubular articles or sheets provided with stripes or areas of two different colors may be made;

Fig. 2 is an enlarged section taken along line 2—2 of Fig. 1;

Fig. 2a is a section on an enlarged scale taken along line 2a—2a of Fig. 2;

Fig. 2b is a section on an enlarged scale taken along line 2b—2b of Fig. 2;

Fig. 2c is a section on an enlarged scale taken along line 2c—2c of Fig. 1;

Fig. 3 is a lengthy substantially straight mold for manufacturing two-color slats with areas of different breadth, schematically illustrated and partly in section;

Fig. 4 is a section taken along line 4—4 of Fig. 3;

Fig. 4a is a perspective view of a part of a distributing device employed in the mold of Fig. 3;

Fig. 5 is a sectional view of a part of a further mold for manufacturing three-colored articles;

Fig. 6 is an enlarged section taken along line 6—6 of Fig. 5;

Fig. 7 is a sectional view of a composite mold similar to that shown in Fig. 1;

Fig. 8 is a sectional view taken along line 8—8 of Fig. 7.

Referring now more particularly to the drawings, there is disclosed in Figs. 1 and 2 a substantially circular shaping member or forming means 15 which has the inner and outer supply conduit portions or tubes 10, 11 which are joined together in concentric fashion and connected to respective extrusion presses (not shown).

Thermo-plastic materials of various colors are fed through these concentrically arranged tubes 10, 11 and arrive at a distributing device 12 from which the materials are guided through conveniently disposed passageways 13a, 14a and from there to a pre-determined discharge zone or nozzle 15a of the mold.

To this end, a forming assembly 15 is arranged having different sections for differently colored materials, which materials are subequently joined together at the end 15a of the assembly to form a tubular article 16 which may be cut at 17 along a generatrix by an adjustable cutter 18 to thereby obtain a multicolored sheet, a piece of plastic material or like finished article. 19 designates an electric or similar heating device surrounding the assembly 15.

Assembly 15 is composed of a central or base member terminating in an outer peripheral edge and a holder or hollow member defined by an inner peripheral edge, said peripheral edges being spaced from each other to form said nozzle 15a of the mold.

Figs. 2, 2a, 2b are respective sectional views of the aforementioned device 12 through which the materials pass, passageways 13, 14 thereof being in communication with said feeding tubes 10, 11.

From distributor device 12 the plastic materials flow past cone-shaped element 12a into respective distributing channels 13a, 14a, channels 14a communicating with recess 14b, as is well understood from Fig. 1.

It is preferred to use as forming or molding materials vinylite resins, vinyl butyral resins, vinyl chloride resins, polyvinyl chloride, polyethylene, vinyl copolymers, polyvinyl derivatives, acetate, etc., cellulose acetate, cellulose butyrateacetate and other known thermo-plastic materials, such as polystyrene, etc.

Articles derived from such molding process consist of colored strips forming one single piece of material of any suitable width and disposition, form flexible sheets used in the manufacture of briefcases and other articles either rigid or semi-rigid. These sheets, tubes or plates may be employed as tiles, decorative elements, wall paper, folding screens, cushioning material for furniture, for bags, baskets, etc.

The areas or stripes 20, 21 of thermo-plastic material may be alternately and contiguously placed in side by side relation and made from one and the same or different types of thermo-plastic materials, preferably forming a homogeneous sheet with different colors and exposed to view at both surfaces of the finished article.

The inner feeding tube 11 as well as outer feeding tube 10 terminates in a series of passageways 13, 14 through which the colored thermo-plastic material is distributed for molding. The disposition and the largeness of those openings determined the quantities of the flow of differently colored materials directed into the respective discharge zone at 15a. The differently colored plastic materials coming from the extrusion presses are then automatically and firmly joined together, do not mix with each other and rather leave a clear line of distinction between the colored stripes when discharged from the mold 15 as seen in Fig. 2c.

Figs. 3 and 4 show the connection of a flat or linear mold with respective feeding tubes 22, 23 communicating with extrusion presses (not shown).

The triangular shaped distributing and forming core or device 24 (Fig. 4a) provided with grooves 22a, 23a disposed in staggered relation to each other is arranged to direct differently colored plastic materials supplied from tubes 22, 23 to pre-determined zones 25a of the mold. 25 is the mold assembly which permits the forming of articles of uniform thickness, which are colored in conformity with a chosen pattern. 26 designates a special heating device for the thermo-plastic materials to be fed into assembly 25.

The device comprises a base and legs converging to an apex. A nozzle communicates with all the grooves along the apex which forms an end of the nozzle. The nozzle walls converge from said edge to compact and unite the several stripes into a continuous strip of uniform thickness.

The assembly, as seen in Fig. 3, may be employed to produce any suitable shape of elongated body or article.

According to the present invention, the mold may be readily changed to produce three colored sheets for which purpose a circular mold is used, as schematically shown in Figs. 5 and 6. The plastic materials come from three extrusion machines (not shown) and are fed to the common die through concentric tubes 30, 31, 32. From the end of these tubes the material is supplied through a distributing device 33 having variously arranged and shaped channels 30a, 31a, 32a which lead to the mold proper to thereby permit feeding of differently colored and substantially parallel streams or bands of materials which are subsequently joined together and leave the mold in the form of a sheet or tube exposing three colored stripes.

In Figs. 5 and 6 the concentric tubes 30, 31, 32 lead to the distributing device 33, 33a containing the channels 30a, 31a, 32a which are more clearly seen in Fig. 6. From these channels the thermo-plastic materials are then fed into the mold (not shown) in a manner as herein above explained with respect to Figs. 1 and 2.

Referring now particularly to Fig. 7, there is shown a combination mold and distributing device in section adapted to function in accordance with the mold assembly schematically shown in Fig. 1. The mold assembly 40 consists in this instance of a central longitudinally extending, upright conduit member 41 and a horizontally extending distributing member 42, the latter being attached to a shaping member 43 and a base member 44, respectively. Around horizontal distributing member 42, shaping member 43 and base member 44 extends a holder 45, which is connected to a manifold 46, hereinafter described. Holder 45 is spacedly arranged with respect to base member 44 and shaping member 43 at 47, the shaping member being fastened to horizontal distributing member 42 at 48, while base member 44 is attached to shaping member 43 by means of screw bolts 49 and 50. Distributing member 42 is held in position by means of holder member 45 which, in turn, threadedly engages manifold 46. Manifold 46 has two horizontal conduit portions 52 and 53 which may be detachably fixed to extrusion means (not shown) from which streams of suitable plastic material of pre-determined colors are supplied which materials are subsequently distributed in upright member 41. To this end, plastic material pressed through conduit portion 52 follows the centrally located passageway 54 of upright member 41 and is subsequently diverted through horizontal distributing member 42 into channel means 55 extending from horizontal distributing member 42 and between holder 45, shaping member 43 and base member 44, channel means 55 terminating into fine and narrow nozzle means 47.

Shaping member 43 and base member 44 form a central member terminating in an outer peripheral edge, whereas holder or hollow member 45 surrounds said central member and is defined by an inner peripheral edge, said outer and said inner peripheral edges forming the aforesaid nozzle means 47.

Plastic material of another color than that supplied through conduit portion 52 is fed through conduit portion 53 and enters conduit portion 56, in which upright member 41 is seated, the latter having peripheral passageways 57 (Fig. 8) which lead into channels 55a extending out of horizontal distributing member 42 and between the latter and holder 45 and between the latter and shaping member 43 and base member 44 so as to terminate into nozzle means 47a, whereby thermo-plastic materials of alternating colors joined together are discharged from nozzle means 47 and 47a in tubular formation, as hereinabove explained with respect to Fig. 1. Horizontal distributing member 42 is threadedly engaged at 51a with holder 45, whereas upright member 41 is detachably secured by means of threads 59 to conduit portion 58.

It can thus be seen that the mold assembly 40 principally consists of a manifold 46 with conduit portions 52, 53, 56 and 58 to which are detachably secured the aforesaid channel and nozzle forming parts 42, 43, 44 and 45. The upright conduit member 41 containing passageways, is also detachable to the manifold, so that all the parts of the assembly may be readily replaced or changed in accordance with the purpose for which the mold and distributing device is intended.

Although the invention has been described in connection with the manufacture of tubular and plate-like articles containing variously arranged colored striped material passing through the entire thickness of the finished article, it is well understood that the principle of this invention may be applied to other shaped products employing thermo-setting or thermo-plastic materials.

Although three specific embodiments of the invention have been described and shown in the drawings, it should be noted that the invention may be realized in modified form and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent is:

1. An apparatus for producing striped products from differently colored thermoplastic materials, comprising a base member having an outer peripheral edge, a holder surrounding said base member and having an inner peripheral edge spaced from said outer peripheral edge of said base member to form nozzle means therebetween, a shaping member attached to said base member and provided with an upwardly tapering wall, substantially horizontally extending distributing means mounted on said tapering wall and centrally thereof, said distributing means being further connected to and positioned centrally of said holder and being provided with a shaping surface complementary to said tapering wall of said shaping member, said shaping surface and said tapering wall terminating in said outer peripheral edge, said holder being provided with an inner forming surface spaced from said shaping surface and said tapering wall to form channel means therebetween, said channel means being in communication with said nozzle means, and respective conduit means for guiding streams of said thermoplastic materials to said channel means, respectively, when said thermoplastic materials are supplied to said conduit means, said conduit means including oppositely disposed horizontal conduit portions and a central upright conduit member fixed to and located intermediate said conduit portions and partitioned to correspondingly communicate with said conduit portions, said upright conduit member being detachably and centrally secured to said holder, said distributing means being provided with respective passageways in communication with said channel means and through said upright conduit member with said conduit portions, respectively, whereby differently colored streams of said materials, when supplied to said conduit portions and compacted to predetermined thickness within said channel means, are united in continuous strip formation upon passage through said nozzle means.

2. An apparatus for producing a striped product from a plurality of differently colored streams of thermoplastic materials, comprising forming means including a base member having an outer peripheral edge, a shaping member mounted on said base member, a holder spaced from and surrounding said base member and said shaping member and terminating in an inner peripheral edge, a distributing member having passageways and spacing said holder from said shaping member and supported by the latter, and conduit means detachably connected to said holder and partitioned for directing said materials separately through said passageways of said distributing member to the space between said holder and said shaping member, said outer peripheral edge of said base member and said inner peripheral edge of said holder forming therebetween nozzle means for the discharge of said product, contiguous walls of said shaping member and of said holder, which define said space, converging toward said nozzle means, whereby said differently colored streams of said materials are compacted to predetermined thickness within said space and are then united in continuous strip formation upon passage through said nozzle means.

References Cited in the file of this patent

UNITED STATES PATENTS

| 817,080 | Mahoney | Apr. 3, 1906 |
| 1,952,469 | Snyder et al. | Mar. 27, 1934 |
| 2,050,214 | Stephens | Aug. 4, 1936 |
| 2,138,378 | Johnson | Nov. 29, 1938 |
| 2,174,779 | Delorme | Oct. 3, 1939 |
| 2,191,829 | Johnson | Feb. 27, 1940 |
| 2,401,236 | Fielitz | May 28, 1946 |
| 2,569,373 | Fay | Sept. 24, 1951 |
| 2,592,658 | Colombo | Apr. 15, 1952 |

FOREIGN PATENTS

| 374,148 | Great Britain | June 6, 1932 |